United States Patent [19]

Lyczek

[11] Patent Number: 5,646,414
[45] Date of Patent: Jul. 8, 1997

[54] METHOD AND APPARATUS FOR MEASURING DISTORTION ANGLE OF WEFT IN TEXTILES

[76] Inventor: Edmund Kazimirz Lyczek, 428 Quail Ridge Cr., Spartanburg, S.C. 29303

[21] Appl. No.: 467,865

[22] Filed: Jun. 6, 1995

[51] Int. Cl.⁶ .................................................. G01N 21/86
[52] U.S. Cl. ........................ 250/559.45; 250/559.37; 356/238
[58] Field of Search .................... 250/559.45, 559.37, 250/559.3; 356/238, 430, 237, 429; 26/51.3–51.5

[56] References Cited

U.S. PATENT DOCUMENTS 4,656,360  4/1987  Maddox et al. .................. 250/559.37
5,416,593  5/1995  Vercruysse ...................... 250/559.45

*Primary Examiner*—Que T. Le

[57] ABSTRACT

A method and apparatus in which an optical system is reciprocally rotated by a constant angular speed motor, while the signal coming from the fabric weft is processed in time measured from the moment the optical system crosses the central angle to the moment the maximum signal is detected for producing an output signal proportional to the angle of weft distortion, or for a preset period of time for producing an output signal not proportional to the angle of the weft distortion.

5 Claims, 3 Drawing Sheets

METHOD AND APPARATUS FOR MEASURING DISTORTION ANGLE OF WEFT IN TEXTILES

BACKGROUND OF THE INVENTION

The invention relates to a process of measuring a distortion angle of weft in textile web, and an apparatus employing said process.

Textile web leaving a loom or a knitting machine has its weft perpendicular to its wrap, but later in the finishing process the weft gets distorted.

Just before drying, the fabric is straighten by a straightening machine controlled by a signal from an apparatus for measuring an angle of weft distortion.

U.S. Pat. No. 3,517,204 describes an apparatus in which an optical system constructed of a single cylindrical lens, slotted aperture stop and a photocell located in front of a light source with the fabric running in between them.

The optical system is reciprocally rotated by an electrodynamic drive system a several degrees about a lateral line perpendicular to the wrap, later called a "central angle", with a rate close to its mechanical resonance frequency. The movement of the optical system is later called "scanning". The light from the light source passes through the fabric and enters the optical system where it is converted to an electric signal by the photocell.

Output signal from the photocell is summed during a time when the optical system is off the central angle with reversed polarity on each side of said center angle.

When the fabric is straight, the output signal is equal to zero because signal from the fabric picked up by the photocell is symmetrically distributed around the central angle; otherwise the output signal is negative or positive. The output signal is not proportional to the angle of distortion, and its absolute value depends upon many factors. Since the range and rate of rotation is constant, determined by the property of the system, there are cases when the output signal is related to a pattern of the fabric rather than to its weft. This happens when the fabric's pattern is within the range of scan. It causes the straightening machine to follow the pattern of the fabric, not its weft.

U.S. Pat. No. 4,786,177 describes an apparatus in which an optical system similar to the one described above is reciprocally rotated about the central angle in steps by a stepper motor controlled by a computer which also processes a signal from the photocell. Position of the stepping motor's shaft directly corresponds to a specific angle at which a sample of the photocell signal is taken. Since the number of samples determined by the number of steps is limited, to improve resolution in this method, the computer finds at what real angle the photocell signal reaches the maximum corresponding to the position of the fabric weft by employing interpolation. The angle of distortion is then converted to a voltage, thus the output signal is proportional to the angle of distortion.

Moreover, in this method, it is possible to change the range and rate of reciprocal rotation of the optical system to cut off unwanted signals coming from the fabric's pattern, which is useful in sensing some fabrics.

The above described method and apparatus has the disadvantage that in hard to read fabrics the computer finds the maximum of the signal at very different angles. Thus output signal is inconsistent, erratic or sometimes wrong.

SUMMARY OF THE INVENTION

The present invention provides a method and an apparatus in which an optical system made of a cylindrical lens, an aperture stop and a photocell is reciprocally rotated by a constant angular speed motor, while the photocell signal which represents the amount of light passed through the fabric is processed in time measured from the moment when optical system crosses a lateral line perpendicular to the wrap of the fabric called "central angle". There are two variations in processing the photocell signal.

In the first variation, the measurement of the distortion angle starts when the optical system crosses the central angle and ends when maximum photocell signal is detected. Since the motor runs at constant angular speed, the period of time elapsed during measurement is strictly proportional to the angle of distortion, and can be converted to any signal for the purpose of a fabric straightening machine control or recording. Polarity of the output signal is determined by the position of the optical system in regard to the central angle.

In the second variation, the measurement starts when the optical system crosses the central angle and lasts for a preset time. During that time a signal from the photocell is stored and its average value is compared with the average value of the signal from the measurement on the other side of the central angle. The difference between these two signals is the signal used for a fabric straightening machine control or recording, not proportional to the angle of the weft distortion.

DESCRIPTION OF THE PREFERRED EMBODIMENTS

Figure 1:
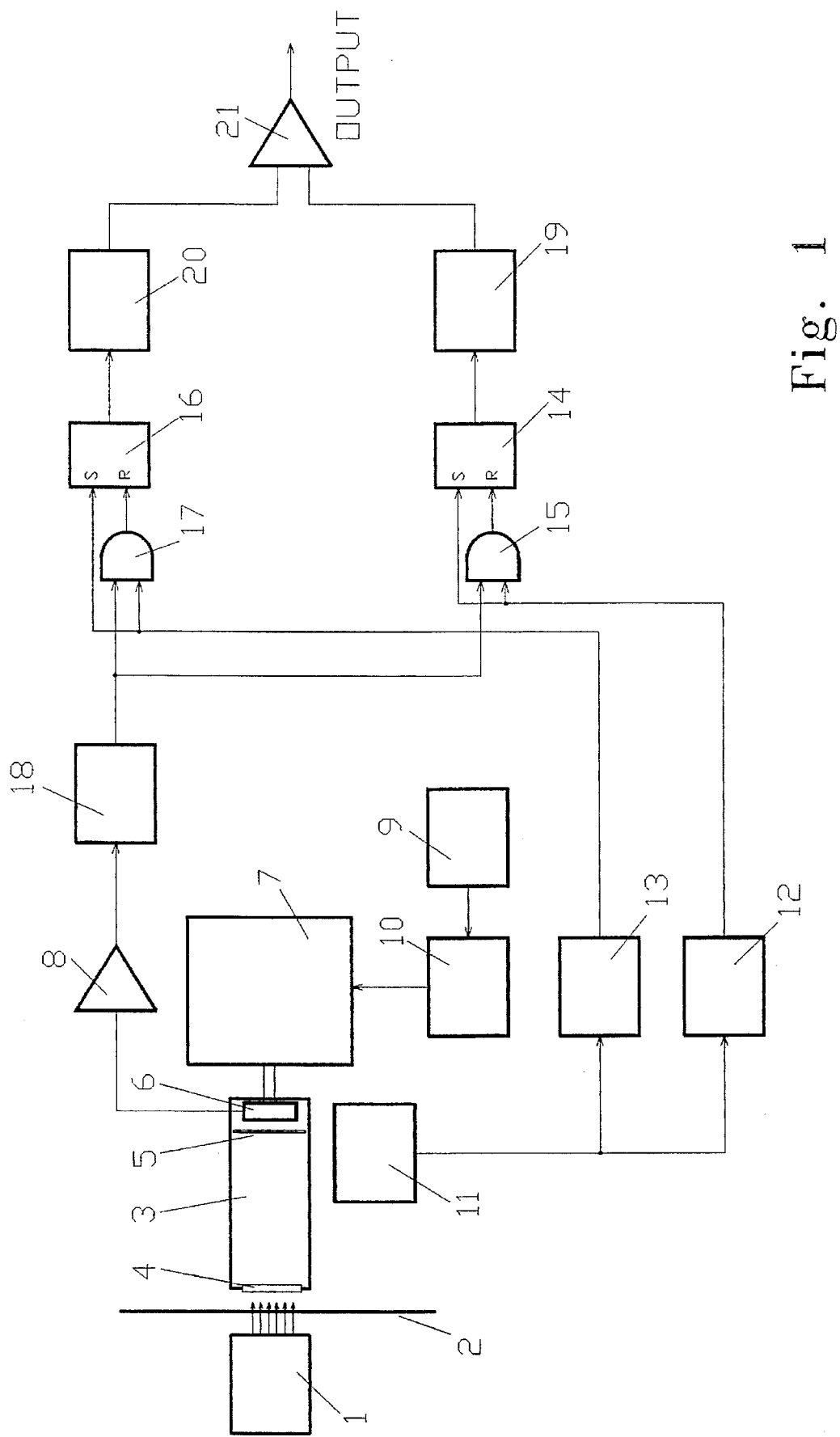
FIG. 1 is a block diagram of the first preferred embodiment of the apparatus according to the first variation of the present invention.

Referring to FIG. 1, in the first preferred embodiment of the apparatus according to the first variation of the present invention, light coming from a light source 1 passes through a fabric 2 and enters an optical system 3 made of a cylindrical lens 4, an aperture stop 5 and a photocell 6. The optical system is mounted on a shaft of a constant angular speed motor 7. The light which passed through the fabric, through the cylindrical lens and the aperture stops falls onto the photocell 6 and it is converted to an electric signal representing the amount of light passed through the fabric 2 is amplified by an amplifier 8. The photocell signal reaches its maximum when the optical system is parallel to the weft. The motor 7 is energized by a power source 9 via a control circuitry 10 which switches the motor 7 on and changes its running direction, thus the optical system 3 is driven in an reciprocal rotational manner. An optical system position detector 11 senses position of the optical system 3 and produces on its output a two-state (HIGH-LOW) signal.

Switching from HIGH to LOW, and vice versa, occurs when the optical system crosses the central angle. All other times the signal is HIGH on one side of the central angle and LOW on the other side.

In practice, the central angle usually is offset from its perpendicular to the wrap position for the purpose of intentional fabric distortion. The signal from the optical system position detector 11 controls the first adjustable timer 12 and second adjustable timer 13 which are producing output pulses every time the optical system crosses the central angle from each direction. To do this, the first adjustable timer 12 is triggered by the optical system position detector's 11 signal going HIGH, while the second adjustable timer 13 is triggered by the optical system position detector's 11 signal going LOW.

The output of the adjustable timer 12 is connected to a "Set" input of an RS flip-flop circuit 14 and one of two inputs of an AND gate 15. The output of the adjustable timer 13 is connected to a "Set" input of an RS flip-flop circuit 16 and one of two inputs of an AND gate 17. The other inputs of the AND gates 15, 17 are connected to the output of a maximum signal detector 18 whose input is connected to the output of the photocell signal amplifier 8. The output of the AND gate 15 is connected to the "Reset" input of the RS flip-flop circuit 14, while the output of the AND gate 17 is connected to the "Reset" input of the RS flip-flop circuit 16.

The output signal from the photocell signal amplifier 8 is processed in a maximum signal detector 18 (also called a peak detector) which produces at its output a short impulse at the moment the signal from the photocell signal amplifier 8 reaches its maximum.

The output pulses from the adjustable timers 12, 13 alternately set the RS flip-flop circuits 14, 16 and open the AND gates 15, 17 while output pulse from the maximum signal detector 18, via opened AND gate 15 or opened AND gate 17 resets the RS flip-flop circuit 14 or 16, thus one of the RS flip-flop circuits produces on its output a pulse, the length of which is proportional to the angle of the weft distortion. The output of the RS flip-flop circuit 14 is connected to the input of the first integrator circuit 19, and the output of the RS flip-flop circuit 16 is connected to the input of the second integrator circuit 20, while their outputs are connected to inputs of a summing amplifier 21 whose output produces a signal proportional to the angle of weft distortion.

The integrator circuits 19, 20 are zeroed every time the respective RS flip-flop circuit is set and their output is disabled until the respective RS flip-flop circuit is reset. Thus the integrator circuit controlled by the RS flip-flop circuit which was not reset during the measurement produces no output signal. The output pulses produced by the adjustable timers 12, 13, by opening the AND gates 15, 17 determine how long the measurement lasts. Normally said pulses are equal to one half of the optical system position detector's 11 HIGH-LOW signal. In this case the effective scan range is equal to the range of movement of the optical system. By adjusting the adjustable timers 12, 13 to produce shorter pulses it is possible to limit the effective scan range, thus cutting off signals related to the fabric's patterns which may interfere with the signal coming from the weft.

Figure 2:
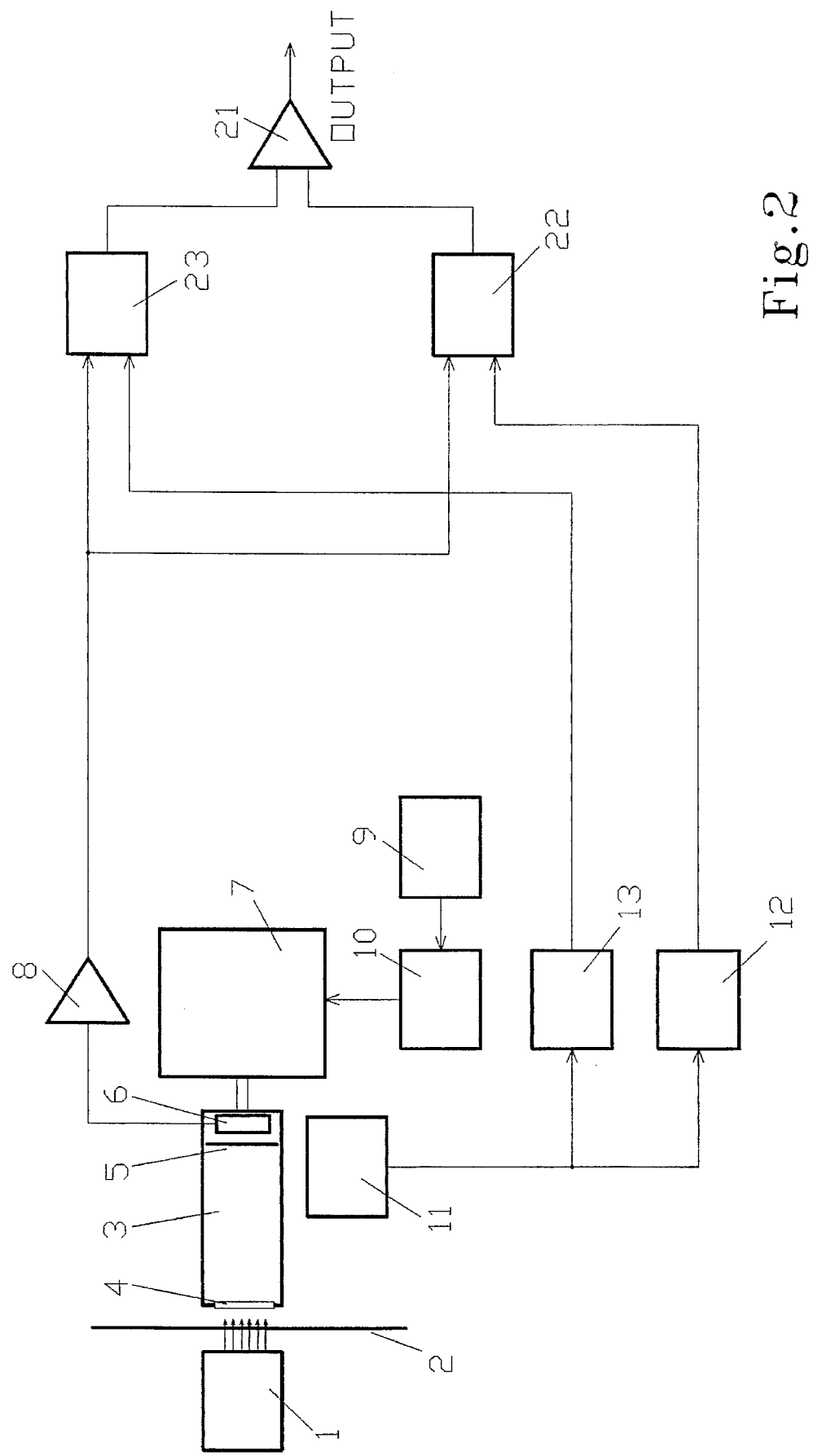
FIG. 2 is a block diagram of the second preferred embodiment of the apparatus according to the second variation of the present invention.

Referring now to FIG. 2, in the second preferred embodiment of the apparatus according to the second variation of the present invention arrangement of the light source 1, the fabric 2, the optical system 3, the cylindrical lens 4, the aperture stop 5, the photocell 6, the constant angular speed motor 7, the photocell signal amplifier 8, the power source 9, the control circuitry 10, the optical system position detector 11, and the adjustable timers 12, 13 is identical to that one described above in the first preferred embodiment of the present invention.

Further, the output of the photocell signal amplifier 8 is connected to signal inputs of a first average signal value circuit 22 and a second average signal value circuit 23 whose outputs are connected to inputs of a summing amplifier 21. The average signal value circuits 22, 23 also have an enable input for the purpose of calculating the average value of the input signal only in the presence of the enable signal while holding the average value on their outputs at all times.

The enable input of the first average signal value circuit 22 is connected to the output of the first adjustable timer 12, while the enable input of the second average signal value circuit 23 is connected to the output of the second adjustable timer 13, thus calculation of the average value of the signal coming from the photocell signal amplifier 8 occurs alternately while pulses from the adjustable timers 12, 13. The output signal produced by the summing amplifier 21 comes from the difference between the average values calculated by the average signal value circuits 22, 23. The output signal is not proportional to the angle of weft distortion, but in case of difficult to read fabrics it can be used for controlling a fabric straightening machine, while the proportional signal can not be used because it tends to be erratic, sometimes with wrong polarity.

Figure 3:
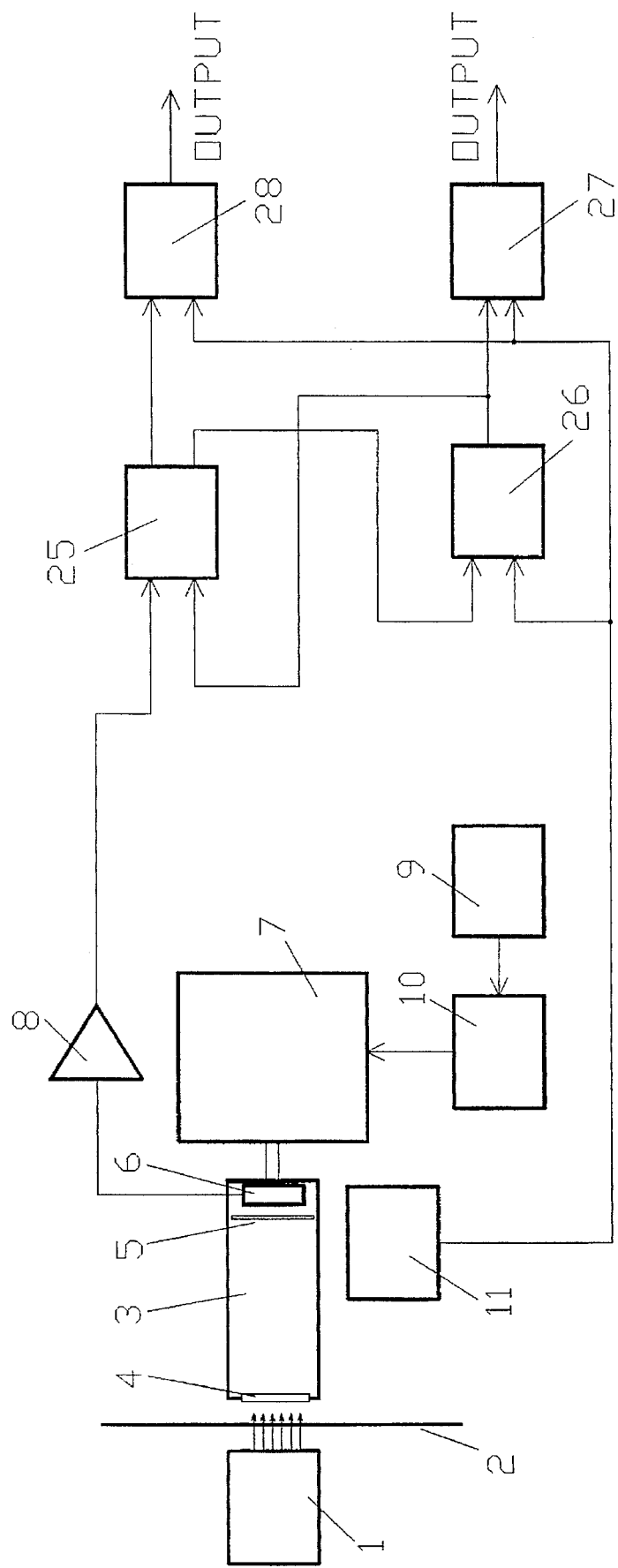
FIG. 3 is a block diagram of the third preferred embodiment of the apparatus according to the present invention.

The method according to the present invention can be executed with the apparatus as explained below in reference to FIG. 3.

In the apparatus, according to the present invention the arrangement of the light source 1, the fabric 2, the optical system 3, the cylindrical lens 4, the aperture stop 5, the photocell 6, the constant angular speed motor 7, the photocell signal amplifier 8, the power source 9, the control circuitry 10, and the optical system position detector 11, is identical to the one described above in the first preferred embodiment and second preferred embodiment of the present invention.

Furthermore, the signal from the output of the amplifier 8 is supplied to a first digital unit 25 which samples the incoming signal, calculates, stores and updates a value of a treshhold which is selected as little less than the highest sample taken during the last several scans. The digital unit 25 also compares treshhold value with every sample it takes, and produces an output pulse every time the value of the sample exceeds the treshhold value. The HIGH-LOW signal from the optical system position sensor 11 is supplied to a second digital unit 26 which produces an adjustable length pulse every time the optical system position sensor signal switches from HIGH to LOW or vice versa.

The second digital unit 26 includes a timer which is zeroed and started periodically by the beginning of the adjustable length pulses, which occurs when the optical system 3 crosses the central angle. The timer is stopped by the output pulses from the first digital unit 25 when the maximum output signal from the photocell signal amplifier 8 is detected, which occurs when the optical system 3 is parallel to the weft.

Since the optical system 3 rotates with a constant angular speed, the elapsed time value measured by the timer inside the digital unit 26 is proportional to the angle of the weft distortion. The elapsed time value is then supplied to a third digital unit 27 (D/A converter) for conversion to an electric current or voltage. The third digital unit 27 receives also the HIGH-LOW signal from the optical system position detector 11. The HIGH-LOW signal is used as a polarity bit which sets the polarity of the output signal from the third digital unit 27. The output signal from the third digital unit 27 is proportional to the angle of the weft distortion and it can be used for a fabric straightening machine control or recording.

Further, the first digital unit 25 calculates the average value of the output signal from the photocell signal amplifier 8 during every adjustable length pulse which is supplied from the second digital unit 26. The average value of the signal is sent to a fourth digital unit 28 which is also fed with the HIGH-LOW signal from the optical system position sensor 11. The fourth digital unit 28 assigns a polarity to the average value coming from the first digital unit 25 in regard to the value of the HIGH-LOW signal and stores the result for a time of one measuring cycle, then produces the output signal by comparing the average values. The output signal is not proportional to the angle of the weft distortion, but it can be used for a fabric straightening machine control.

I claim:

1. A method for measuring an angle of weft distortion in textiles comprising the steps of:

a. moving an optical system made of a cylindrical lens, a slotted aperture stop and a photocell, positioned in front of a passing fabric, with a light source located on the opposite side of the fabric, in an reciprocal rotational manner about lateral line perpendicular to the fabric's wrap called a "central angle" with a constant angular speed for measuring an amount of light passing through the fabric and, b. detecting the moment the optical system crosses the central angle and, c. detecting the moment the amount of light passing through the fabric reaches its maximum and, d. measuring elapsed period of time from the moment the optical system crosses the central angle to the moment the amount of light passing through the fabric reaches its maximum and, e. converting the elapsed period of time value to an electric signal for the purpose of using it as a fabric straightening machine control signal proportional to the angle of weft distortion.

2. A method according to claim 1 where instead of the steps (c), (d) and the step (e) comprising the steps of:

a. measuring an average value of the light passing through the fabric during a preset period of time measured from the moment the optical system crosses the central angle and, b. comparing the average value of the signal from the measurement on one side of the central angle with the average value of the signal from the measurement on the other side of the central angle wherein the difference between said signals is the signal used for the purpose of a fabric straightening machine control, not proportional to the angle of weft distortion.

3. An apparatus for measuring an angle of weft distortion in textiles constructed of a light source, an optical system made of a cylindrical lens, a slotted aperture stop and a photocell, an optical system position detector and a photocell signal amplifier, with a fabric passing between the light source and the optical system comprising:

a. a constant angular speed motor for driving the optical system in a reciprocal rotational manner about a lateral line perpendicular to the wrap of the fabric called a "central angle", b. a control circuitry means for switching on and changing a running direction of said constant angular speed motor, c. a maximum signal detector means for detecting maximum of the signal produced by the photocell and amplified by the photocell signal amplifier, d. first adjustable timer and second adjustable timer connected to the output of the optical system position detector for generating an output pulse every time the optical system crosses the central angle from each direction respectively, for limiting an effective scanning range, e. first AND gate and second AND gate having one of their inputs connected to the output of the maximum signal detector and the other inputs connected to the first and second adjustable timers respectively, f. first RS flip-flop circuit and second RS flip-flop circuit having their SET inputs connected to the outputs of the first and second adjustable timers, and their RESET inputs connected to the outputs of the AND gates respectively, for producing a pulse with length proportional to the angle of the weft distortion, g. first integrator circuit, second integrator circuit and a summing amplifier wherein the input of the first integrator circuit is connected to the output of the first RS flip-flop circuit and the input of the second integrator circuit is connected to the output of the second RS flip-flop circuit while their outputs are connected to the inputs of the summing amplifier for converting said pulses to electric current or voltage.

4. An apparatus for measuring an angle of weft distortion in textiles constructed of a light source, an optical system made of a cylindrical lens, a slotted aperture stop and a photocell, an optical system position detector and a photocell signal amplifier, with the fabric passing between the light source and the optical system comprising:

a. a constant angular speed motor for driving the optical system in a reciprocal rotational manner about a lateral line perpendicular to the wrap of the fabric called a "central angle", b. a control circuitry means for switching on and changing a running direction of said constant angular speed motor, c. first adjustable timer and second adjustable timer connected to the output of the optical system position detector for generating an output pulse every time the optical system crosses the central angle, from each direction respectively, for limiting effective scanning range, d. first average signal value circuit and second average signal value circuit, each having a signal input, an enable input and an output, wherein their signal inputs are connected to the output of the photocell signal amplifier and their enable inputs are connected to the outputs of the first adjustable timer and the second adjustable timer respectively, for the purpose to calculate the average value of the photocell signal only during the presence of said pulses from the first and second adjustable timers, while holding the average value on their outputs all the time, e. a summing amplifier having its inputs connected to the outputs of the first average value circuit and the second average value circuit for producing a signal proportional to the difference between the signals from said average value circuits for the purpose of using it as a fabric straightening machine control signal not proportional to the angle of weft distortion.

5. An apparatus for measuring an angle of weft distortion in textiles constructed of a light source, an optical system made of a cylindrical lens, a slotted aperture stop and a photocell, an optical system position detector and a photocell signal amplifier, with a fabric passing between the light source and the optical system comprising:

a. a constant angular speed motor for driving the optical system in a reciprocal rotational manner about a lateral line perpendicular to the wrap of the fabric called a "central angle", wherein the optical system position detector detects a moment the optical system crosses the central angle, b. a control circuitry means for switching on and changing a running direction of said constant angular speed motor, c. a first digital means for measuring an average value of the signal produced by the photocell and amplified by the photocell signal amplifier which represents an amount of light passing through the fabric while detecting the moment said signal reaches its maximum, d. a second digital means for measuring a period of time elapsed from the moment the optical system crosses the central angle to the moment the maximum of signal from the photocell signal amplifier is detected, e. a third digital means for converting the elapsed time value to electric current or voltage for producing a signal used for a fabric straightening machine control, proportional to the angle of the weft distortion, f. a fourth digital means for comparing the average values of the photocell signal amplifier's output signal coming from both sides of the central angle, wherein the difference between said signals is the output signal used for a fabric straightening machine control, not proportional to the angle of weft distortion.

* * * * *